United States Patent
Wang

Patent Number: 5,940,616
Date of Patent: Aug. 17, 1999

[54] TRACKER CLASS FOR OBJECT-ORIENTED PROGRAMMING ENVIRONMENTS

[75] Inventor: I-Shin Andy Wang, San Jose, Calif.

[73] Assignee: International Business Machines Corporation, Armonk, N.Y.

[21] Appl. No.: 08/656,445

[22] Filed: May 31, 1996

[51] Int. Cl.$^6$ .................................................. G06F 9/45
[52] U.S. Cl. ........................................ 395/704; 395/703
[58] Field of Search .................................. 395/500, 700, 395/701, 705, 683, 704, 710, 183.14, 183.18, 702; 364/280, 280.4, 281.3, 282.1, 284, 284.3; 707/101

[56] References Cited

U.S. PATENT DOCUMENTS

| | | | |
|---|---|---|---|
| 4,989,132 | 1/1991 | Mellender et al. | 395/705 |
| 5,297,283 | 3/1994 | Kelly, Jr. et al. | 395/674 |
| 5,303,379 | 4/1994 | Khoyi et al. | 395/710 |
| 5,459,865 | 10/1995 | Heninger et al. | 395/678 |
| 5,488,721 | 1/1996 | Rich et al. | 707/103 |
| 5,519,862 | 5/1996 | Schaeffer et al. | 395/701 |
| 5,542,078 | 7/1996 | Martel et al. | 707/101 |
| 5,550,563 | 8/1996 | Matheny et al. | 345/168 |
| 5,581,760 | 12/1996 | Atkinson et al. | 395/702 |
| 5,581,765 | 12/1996 | Munroe et al. | 395/677 |
| 5,603,030 | 2/1997 | Gray et al. | 395/705 |
| 5,606,661 | 2/1997 | Wear et al. | 395/183.14 |
| 5,652,888 | 7/1997 | Burgess | 395/683 |
| 5,692,183 | 11/1997 | Hapner et al. | 395/500 |
| 5,740,440 | 4/1998 | West | 395/704 |

OTHER PUBLICATIONS

Fiedler, Steven P.; "Object–oriented unit testing"; Hewlett–Packard Jounal, v.40, n2, p.69(6), Apr., 1989.

Lamb, Charles; Landis, Gordon; orenstein, Jack; Weinreb, Dan "The ObjectStore database system"; Communications of the ACM, v34, n10, p.50(14), Oct., 1991.

*Primary Examiner*—James P. Trammell
*Assistant Examiner*—Demetra R. Smith
*Attorney, Agent, or Firm*—Merchant, Gould, Smith, Edell, Welter & Schmidt

[57] ABSTRACT

The present invention discloses a method, apparatus, and article of manufacture for providing object tracking capabilities in object-oriented programming environments using a tracker class and associated functions, and a memory for storing tracker objects. The tracker class, once defined as a base class of any target class that needs the tracking capability, automatically tracks all the objects instantiated from the target class in a linked list. Objects instantiated from classes derived from the tracker class are automatically tracked when the target objects are initialized, be it on a heap or on a stack, because the constructor of the tracker class is invoked by the constructor of the target class. The tracker class is defined as a template, so that it can be applied to any type of target object.

31 Claims, 12 Drawing Sheets

```
1    // tracker.h
2    #ifndef TRACKER_H
3    #define TRACKER_H
4
5    #include <stddef.h>
6
7    typedef enum
8    {
9       TRACK,        // Track the object
10      DONT_TRACK    // Do not track the object
11   } TRACK_FLAG;
12
13   class Tracker
14   {
15      friend class Tracker_Iterator;
16      const void *p_obj;
17      Tracker *next
18      Tracker *prev; public:
19      Tracker ();
20      // avoid default member-by-member copying
21      Tracker (const Tracker &r);
22      // avoid default member-by-member copying
23      Tracker &operator = (const Tracker &r);
24      ~Tracker ();
25      void insert (Trakcer *&root, const void *p_obj_, TRACK_FLAG);
26      void remove (Tracker *&root);
27   };
28
29   inline
30   Tracker::Tracker ()
31   {
32   }
33
34   inline
35   Tracker::Tracker(const Tracker &r)
36   {
37   }
38
39   inline
40   Tracker::~Tracker ()
41   {
42   }
43
44   inline
45   Tracker &Tracker::operator =(const Trakcer &r)
46   {
47      return (Tracker &) *this;
48   }
49
```

FIG. 8A

```
50
51   class Tracker_Iterator
52   {
53      Tracker *next; public:
54      Tracker_Iterator (const Tracker *root);
55      ~Tracker_Iterator ();
56       const void *get_next();
57   };
58
59   inline
60   Tracker_Iterator::~Tracker_Iterator()
61   {
62   }
63
64   inline
65   Tracker_Iterator::Tracker_Iterator(const Tracker *root)
66   {
67      next = (Tracker *) root;
68   }
69
70   inline const void *Tracker_Iterator::get_next()
71   {
72      const Tracker *temp = next;
73
74      if (next != NULL
75      {
76         next = next->next;
77         return temp->p_obj;
78         }
79         return NULL;
80   }
81
82   #endif
```

FIG. 8B

```
1    // ttracker.h
2    #ifndef TTRACKER_H
3    #define TTRACKER_H
4
5    #include "tracker.h"
6
7    template <class T> class TTracker : public Tracker
8    {
9       friend class TTracker_Iterator<T>;
10      static Tracker *root; public:
11      TTracker (TRACK_FLAG track_flag = TRACK);
12      ~Tracker ();
13   };
14
15   template <classT>
16   Tracker *TTracker<T>::root = NULL;
17
18   template <class T> inline
19   TTracker<T>::TTracker(TRACK_FLAG track_flag)
20   {
21      // This casting is essential for obtaining the original address.
22      insert (root, (const T *) this, track_flag);
23   }
24
25   template <class T> inline
26   TTracker<T>::~TTracker()
27   {
28         remove (root);
29   }
30
31   template    <class    T>    class    TTracker_Iterator    :    public
32   Tracker_Iterator
33   { public:
34      TTracker_Iterator();
35      ~TTracker_Iterator();
36      const T *get_next() const;
37   };
38
39   template <class T> inline
40   TTracker_Iterator<T>::TTracker_Iterator()
41   : Tracker_Iterator(T::root)
42   {
43   }
44
45   template <class T> inline
46   TTracker_Iterator<T>::~TTracker_Iterator()
47   {
48   }
49
50
```

FIG. 9A

```
51
52   template <class T> inline const T *TTracker_Iterator<T>::get_next()
53   const
54   {
55      return        (const     T    *)    ((Tracker_Iterator    *)
56   this)->Tracker_Iterator::get_next();
57   }
58
59   #endif
```

FIG. 9B

```
1     // tracker.cpp
2     #include "tracker.h"
3
4     void Tracker::insert(Tracker *&root,
5                          const void *p_obj_,
6                          TRACK_FLAG track_flag)
7     {
8        prev = NULL;
9        if (track_flag == TRACK)
10       {
11          Tracker *temp = root;
12
13          root = this;
14          p_obj = p_obj_;
15          if (temp == NULL)
16             next = NULL;
17          else
18          {
19              next = temp;
20              temp->prev = this;
21          }
22       }
23       else
24       {
25          next  = NULL;
26          p_obj = NULL; // do not track this object
27       }
28    }
29
30    void Tracker::remove(Tracker *&root)
31    {
32        // do nothing since it was not tracked on the list
33        if (p_obj == NULL) return;
34        if (prev == NULL)
35        {
36            if (next  != NULL)
37                next->prev = NULL;
38            root = next;
39        }
40        else prev->next = next;
41    }
42
```

FIG. 10

```cpp
// main.cpp
// sample code for using TTracker<T> and TTracker_Iterator<T>
#include <iostream.h>
#include "ttracker.h"

class A : public TTracker<A>
{
   int i; public:
   A(int i_);
   friend osream &operator << (ostream &os, const A &r);
};

inline
A::A (int i_)
{
   i = i_;
} inline ostream &operator << (ostream &os, const A &r)
{
   os << r.i;
   return os;
} void main()
{

// instantiate objects on the stack
    A a0(0), a1(1), a2(2);

// instantiate objects on the heap
    A *p = new A(3), *q = new A(4), *r = new A(5);

// instantiate iterator "ai" for class A
    TTracker_Iterator<A> ai;

// define temp pointer
    const A *temp;

// iterate through all the objects tracked by TTracker<A>
    while ((temp = ai.get_next()) != NULL)
       cout << *temp << endl;

// cleanup objects on heap
    delete p;
    delete q;
    delete r;
}
```

TRACKER CLASS FOR OBJECT-ORIENTED PROGRAMMING ENVIRONMENTS

BACKGROUND OF THE INVENTION

1. Field of the Invention

The present invention relates generally to object-oriented programming, and in particular, to a tracker class for managing objects created in object-oriented programming environments.

2. Description of Related Art

In C++ and other object-oriented programming environments, programmers create classes that define data members as well as a set of functions, typically referred to as member functions, for manipulating the data members. Each instance of a class, i.e., each object, has its own set of the data members and member functions of its class.

One significant drawback to object-oriented programming environments is that all the instances of a class, i.e., all the objects, are not managed in any standard manner. Generally, it is up to the programmer to define and program the management of objects. As a result, there is a need in C++ and other object-oriented programming environments for a tracker class that can be inherited by other objects, wherein the tracker class provides data members and member functions for managing objects instantiated in the environments.

SUMMARY OF THE INVENTION

To overcome the limitations in the prior art described above, and to overcome other limitations that will become apparent upon reading and understanding the present specification, the present invention discloses a method, apparatus, and article of manufacture for providing object tracking capabilities in object-oriented programming environments using a tracker class and associated functions, and a memory for storing tracker objects. The tracker class, once defined as a base class of any target class that needs the tracking capability, automatically tracks all the objects instantiated from the target class in a linked list. Objects instantiated from classes derived from the tracker class are automatically tracked when the target objects are initialized, be it on a heap or on a stack, because the constructor of the tracker class is defined as a template, so that it can be applied to any type of target object.

BRIEF DESCRIPTION OF THE DRAWINGS

Referring now to the drawings in which like reference numbers represent corresponding parts throughout:

FIGS. 8A–11 illustrate source code.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

OVERVIEW

The present invention comprises a method, apparatus, and article of manufacture for providing a tracker class for managing objects created in object-oriented programming environments, and a memory for storing tracker objects. The tracker class allows a programmer to manage all instances of a class, i.e., all objects, in a well-defined manner.

In the prior art, object-oriented programming environments, such as C++, do not provide the capability to track objects of a class. Any number of objects may be created, or instantiated, from a class, but there is no defined way for the environment to automatically determine how many such objects have been created. In effect, the management of objects is left to the design of the programmer.

The present invention enables object tracking capabilities in object-oriented programming environments with a new tracker class. The tracker class, once defined as a base class of any class that needs the tracking capability, automatically tracks all the objects of the class in a data structure, such as a linked list or other data structure. A programmer need only create a target object so that the target object inherits the tracker class. A constructor function of the tracker class insures that the target object is inserted into the data structure when the target object is created, so that the target object may be tracked and managed in a well-defined manner. In addition, a destructor function of the tracker class insures that the target object is deleted from the data structure when the target object is deleted. The constructor function of the tracker class is automatically invoked by the constructor function for the target object, and similarly, the destructor function of the tracker class is automatically invoked by the destructor for the target object.

Some of the features for the tracker class invention include the following:

1. A template tracker for customizing the tracker class to the target class,
2. Static linked lists route built in the template tracker class,
3. Operator overloading and copy constructor for solving member-by-member copy problems, and
4. Pointer casting for solving pointer offset problems.

The techniques of the present invention can be applied to a number of different areas which require object tracking such as debugging, memory management, document and view tracking, rule inferencing, etc.

HARDWARE ENVIRONMENT

Figure 1:
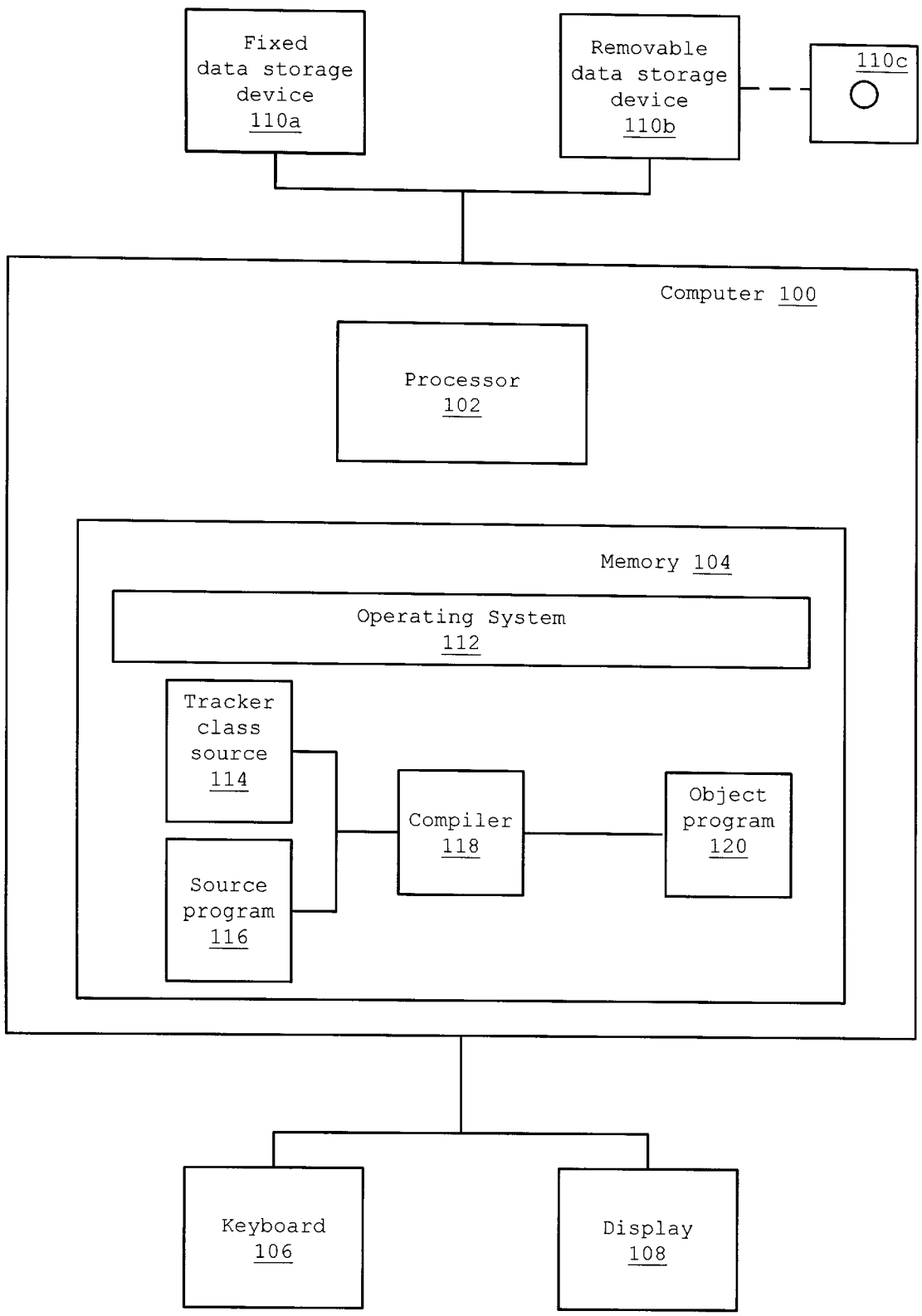
FIG. 1 is a block diagram illustrating an exemplary hardware environment used to implement the preferred embodiment of the invention.

FIG. 1 is a block diagram illustrating an exemplary hardware environment used to implement the preferred embodiment of the invention. In the exemplary hardware environment, a computer 100 may include, inter alia, a processor 102, memory 104, keyboard 106, display 108, as well as fixed and/or removable data storage devices and their associated media 110a, 110b, and 110c. The computer 100 operates under the control of an operating system 112, such as OS/2™, Windows™, AIX™, UNIX™, DOS™, etc. Those skilled in the art will recognize that any combination of the above components, or any number of different components, peripherals, and other devices, may be used with the computer 100.

The present invention is generally implemented by incorporating tracker class source code 114 into a source program 116 and compiling the tracker class source code 114 and source program 116 using a compiler program 118 to create an object program 120. In the preferred embodiment, the tracker class source code 114, source program 116, and compiler 118 conform to C++ language conventions, although those skilled in the art will recognize that they could conform to other object-oriented programming language conventions without departing from the scope of the present invention. Further, the compiler 118 may also include such elements as pre-processors, linkers, etc.

The compiler 118 performs an analysis of the tracker class source code 114 and source program 116 containing source language statements, wherein the tracker class source code 114 and source program 116 are generally stored in a text file on the data storage devices 110a–c or entered interactively by a programmer from the keyboard 106. The compiler 118 then synthesizes an object program 120 from the source language statements in the tracker class source code 114 and source program 116.

Using standard language conventions, a programmer can enter source language statements into the tracker class source code 114 and source program 116 that specify a tracker class and other classes that inherit the tracker class. These source language statements, when recognized by the compiler 118, result in the generation of an object program 120 containing instructions for generating data members for the tracker class and for performing the member functions necessary to manipulate those data members according to the present invention.

In creating the object program 120, the compiler 118 may also include other source code, such as header files, libraries, etc. Further, the compiler 118 may link the object program 120 to other executable object code, such as libraries, etc., during compilation. In addition, the operating system 112 may link the object program 120 to other executable object code, such as dynamic link libraries, etc., at run-time.

Generally, the operating system 112, tracker class source code 114, source program 116, compiler 118, and object program 120 are all tangibly embodied in a computer-readable medium, e.g., one or more of the fixed and/or removable data storage devices and their associated media 110a–c. Moreover, the operating system 112, compiler 118, and object program 120, are all comprised of instructions which, when read and executed by the computer 100, cause the computer 100 to perform the steps necessary to implement and/or use the present invention. Under control of the operating system 112, the compiler 118, and object program 120 may be loaded from the data storage devices 110a–c into the memory 104 of the computer 100 for use during actual operations in implementing and/or performing the present invention.

DEFINING TRACKER OBJECTS

Typically, a programmer would implement the present invention by creating a source program 116 for an application. The source program 116 may include (via an "#include" or other source language statement) one or more files that store the tracker class source code 114. The combined tracker class source code 114 and source program 116 are then compiled by the compiler 118. As will be discussed more fully below, the source program 116 includes other objects from classes that have been specifically selected or created to perform the functions of a desired application. The source program 116 uses the tracker class definitions and implementations from tracker class source code 114 to manage all instances of the these other classes through one or more tracker objects.

Tracker Class Definition

FIGS. 8A and 8B illustrate a source code file or module named TRACKER.H and comprise an example of source language statements that define the tracker class in the tracker class source code 114 according to the present invention. In this example, the tracker class is known as "Tracker". Objects of classes derived from the tracker class, i.e., that inherit the tracker class, are automatically tracked when the objects are initialized, be it on a heap or on a stack.

Lines 2–3 of FIGS. 8A and 8B provide methods of conditional compilation for the TRACKER.H module. The directive "#ifndef tracker_h" on line 2 indicates that if a macro name "tracker_h" is currently undefined in the compiler 118 by a "#define" statement, then the following block of code (until a corresponding, nested "#endif" directive) is compiled. The directive "#define tracker_h" on line 3 defines the block under macro name "tracker_h" in the compiler 118.

At line 5, a header file for standard class definitions is included.

Lines 7–11 provide an enumeration or set of named integer constants that specify the legal values TRACK and DONT_TRACK for the variable TRACK_FLAG. In this example, the value TRACK indicates to the tracker object that the object is to be tracked, and the value DONT_TRACK indicates to the tracker object that the object is not to be tracked.

Lines 13–27 are the class declaration for the tracker class, wherein line 13 names the class Tracker and lines 15–26 comprise public data and functions for the class.

Line 15 is the class declaration for the Tracker_Iterator class, which is declared as a "friend." The "friend" mnemonic means that the Tracker_Iterator class can freely access the data members of the Tracker class.

At line 16, a public pointer "p_obj" is defined. The pointer p_obj points to a target object when a tracker object is allocated and defined.

At line 17, a pointer "next" is defined. The pointer next points to the next tracker object in the linked list.

At line 18, a public pointer "prev" is defined. The pointer prev points to the previous tracker object in the linked list.

A prototype for a constructor function of the tracker class, Tracker, is declared at line 19. As is well known in the art, the constructor function is called whenever an object of the tracker class is instantiated. According to the present invention, the constructor function receives no arguments as indicated by the empty parentheses ( ) in the constructor function's prototype.

At line 21, a prototype of a copy constructor function is declared. By default, when one object is used to initialize another, as in the present case with regards to the target class inheriting and thus initializing each instance of the tracker class, C++ performs a bit-wise copy, so that an identical copy of the initializing object is created in the tracker object. However, a bit-wise copy must be avoided when a target object allocates memory during creation, so that the tracker object does not share the same memory. Using the copy constructor, the bit-wise copy is bypassed, and the tracker object does not share the same memory as the target object.

At line 23, an overloaded assignment operator is declared as a member function prototype, so that member-by-member copying is avoided.

A prototype for a destructor function of the tracker class, ~Tracker, is declared at line 24. As is well known in the art, the destructor function is called whenever the object of the tracker class is deleted. According to the present invention, the destructor function receives no arguments as indicated by the empty parentheses ( ) in the destructor function's prototype.

At lines 25–26, prototypes for additional member functions of the tracker class, named insert and remove, are declared. These functions are also discussed more fully below.

At lines 29–32, the constructor for the class is defined. As can be seen, no initialization operations are provided at creation of the object. Also, the "inline" directive means that the function is not called; rather, the code is expanded inline at the point of each invocation by the compiler 118 in order to create more efficient code.

At lines 34–37, a copy constructor function for the class is defined, wherein a pointer to the object is passed as an argument. Again, no initialization operations are provided.

At lines 39–42, the destructor for the class is defined. As can be seen, no other operations are performed at the deletion of the object.

At lines 44–48, the overloaded assignment operator, which is a member function, is defined. This function returns a reference to the current tracker object identified by the "this" pointer.

Lines 51–57 are the class declaration for the Tracker_Iterator class, wherein line 51 names the class Tracker_Iterator and lines 52–57 comprise private and public data, and member functions for the class.

At line 53, a pointer "next" is defined.

At line 54, a prototype for a constructor function for the Tracker_Iterator class is declared.

At line 55, a prototype for a constructor function of the Tracker_Iterator class is declared.

At line 56, a prototype for a member function, named get_next, is declared.

At lines 59–62, the constructor function for the Tracker_Iterator class is defined. There are no initialization operations performed by this function.

At lines 64–80, the copy constructor function for the Tracker_Iterator class is defined. Within this function, the pointer root is stored in the pointer next.

At lines 70–80, the get_next member function is defined. Within this function, the pointer next is stored into the pointer temp. The value in next is then examined to determine whether it is null. If not, then the pointer next is advanced to the next object in the linked list and the function returns a pointer to the target object. Otherwise, a null is returned.

Template Tracker Class Definition

FIGS. 9A and 9B are a source code file or module named TTRACKER.H and comprise an example of source language statements that define a template tracker class in the tracker class source code 114 according to the present invention.

In this example, the template is known as "TTracker" and itself is a class definition. By using a template, a generic tracker class is defined that includes all of the member functions used by the tracker class, but the actual type of data being manipulated is specified as a parameter when objects of the tracker class are created. As described above, a tracker object is instantiated when objects of a target class that inherits the tracker class are created. As a result, objects of target classes derived from the template tracker class are automatically tracked when the target objects are initialized, be it on a heap or on a stack.

Lines 2–3 of FIGS. 9A and 9B provide methods of conditional compilation for the TTRACKER.H module. The directive "#ifndef ttracker_h" on line 2 indicates that if a macro name "ttracker_h" is currently undefined in the compiler 118 by a "#define" statement, then the following block of code (until a corresponding, nested "#endif" directive) is compiled. The directive "#define ttracker_h" on line 3 defines the block under macro name "ttracker_h" in the compiler 118.

At line 5, the tracker class definition from FIGS. 8A and 8B, which is stored in the file "tracker.h", is included.

Lines 7–13 are a generic class declaration for the template tracker class, wherein <class T> is the placeholder type name that is specified when the class is instantiated, TTracker names the class, and Tracker indicates that it inherits from the tracker class definition described in FIGS. 8A and 8B. Lines 9–12 comprise public data and member functions for the TTracker class.

At line 9, the class TTracker_Iterator is declared as a "friend."

At line 10, a pointer root is defined for the TTracker class.

A prototype of a constructor function of the template tracker class, TTracker, is declared at line 11.

A prototype of a destructor function of the template tracker class, TTracker, is declared at line 12.

At lines 15–16, the root pointer is initialized to null.

At lines 18–23, the constructor function for the class is defined. The pointer "this" to the current object is cast, depending on the type of object, during the call to the insert member function to obtain the address of the first memory location of the object being tracked.

At lines 25–29, the destructor function for the class is defined. The pointer "root" is passed to the remove member function to delete the current object.

At lines 31–37, the TTracker_Iterator class is declared. Lines 33–37 comprise public member functions for the class, including declarations of a constructor, destructor and get_next functions.

At lines 39–43, the constructor function for the TTracker_Iterator class is defined.

At lines 45–48, the destructor function for the TTracker_Iterator class is defined.

At lines 52–57, the get_next member function is defined, wherein the function returns the pointer to the next object in the linked list.

Template Tracker Class Implementation

FIG. 10 illustrates a source code file or module named TTRACKER.CPP and comprises an example of source language statements that define the template tracker class implementation in the source code 114 according to the present invention.

At line 2, the tracker class definition from FIGS. 8A and 8B, which is stored in the file "tracker.h", is included.

At lines 4–28, an insert function is defined. The insert function was declared in FIGS. 8A and 8B as a member function of the Tracker class. Three arguments are passed to the insert function, including the pointer root to the first tracker object in the linked list, the pointer p_obj to the target object, and the variable TRACK_FLAG indicating whether the object should be tracked or not. In the insert function, the tracker object is inserted at the beginning of the linked list. In the insert function, the pointer prev is first set to null and the TRACK_FLAG variable is tested to see whether or not tracking is enabled for the target object. If the TRACK_FLAG variable is equal to TRACK, then the following functions are performed. The root pointer is stored in a temp pointer. The root pointer is then set to the current object using the "this" pointer. The pointer p_obj is set to the target object in the passed parameter. If the pointer temp is null, then the pointer next is set to null; otherwise, the pointer next is set to the value in the temp pointer and the temp pointer is set to the value in the prev pointer, which itself is set to the value of the current object using the "this" pointer. If the TRACK_FLAG variable is equal to DONT_TRACK, then the next pointer set to null, and the passed pointer p_obj is also set to null to indicate that the target object is not being tracked.

At lines 30–41, a remove function is defined. The remove function was declared in FIGS. 8A and 8B as a member function of the tracker class. One argument is passed to the function, i.e., the pointer root to the first tracker object in the linked list. If the pointer p_obj to the current target object is null, indicating the target is not being tracked, then control is returned to the calling instruction. Otherwise, if the prev pointer is null and the next pointer is not null, then the next pointer is set to the value of the prev pointer, which in turn is set to the value of null. The pointer root is then set to the value of the next pointer. Otherwise, if the prev pointer is null, then the prev pointer is set to the value of the next pointer, which in turn is set to the value of the next pointer.

Instantiation of Target and Tracker Objects

FIG. 11 illustrates an example of a partial listing of source language statements for a source program 116 that define a target class and then instantiate a tracker object, which in turn instantiates the tracker object and invokes a constructor function of the tracker class.

At line 3, the header file for the "iostream" class declarations is included, and at line 4, the class declarations for the "TTracker" template are included.

Lines 6–11 are the class declaration for the class "A", which is based on the template TTracker. At line 8, an integer variable "i" is declared. At line 9, a prototype of a constructor function for class A is declared. At line 10, a prototype of a member function that overloads the << operator is defined, which allows the tracker class in A to be copied to the stream output class for printing.

At lines 13–17, the constructor function for the A class is defined. As can be seen, the variable "i" is initialized with the passed parameter.

At lines 19–23, the overloaded << operator is defined. This function creates an output function for the objects instantiated from class A. The variable "i" from the object is copied into the output stream object and then the functions returns the object.

At lines 25–39, the main procedure is defined.

At line 27, three objects from class A are instantiated on the stack, i.e., objects a0, a1, and a2.

At line 28, three objects from class A are instantiated on the heap, i.e., objects p, q, and r.

At line 30, an iterator "ai" is created for class A.

At line 31, a pointer "temp" is defined for class A.

Lines 33–35 iterate through all the objects tracked by TTracker<A>, wherein each object is outputted via the "cout" function followed by an endline (endl) indicator. These steps result in the printing of the objects, in linked list order, which would result in a single column list "5 4 3 2 1."

Finally, at lines 45–47, the objects on the heap, i.e., p, q and r, are deleted, and the main procedure ends.

COMPILATION LOGIC

Figure 2:
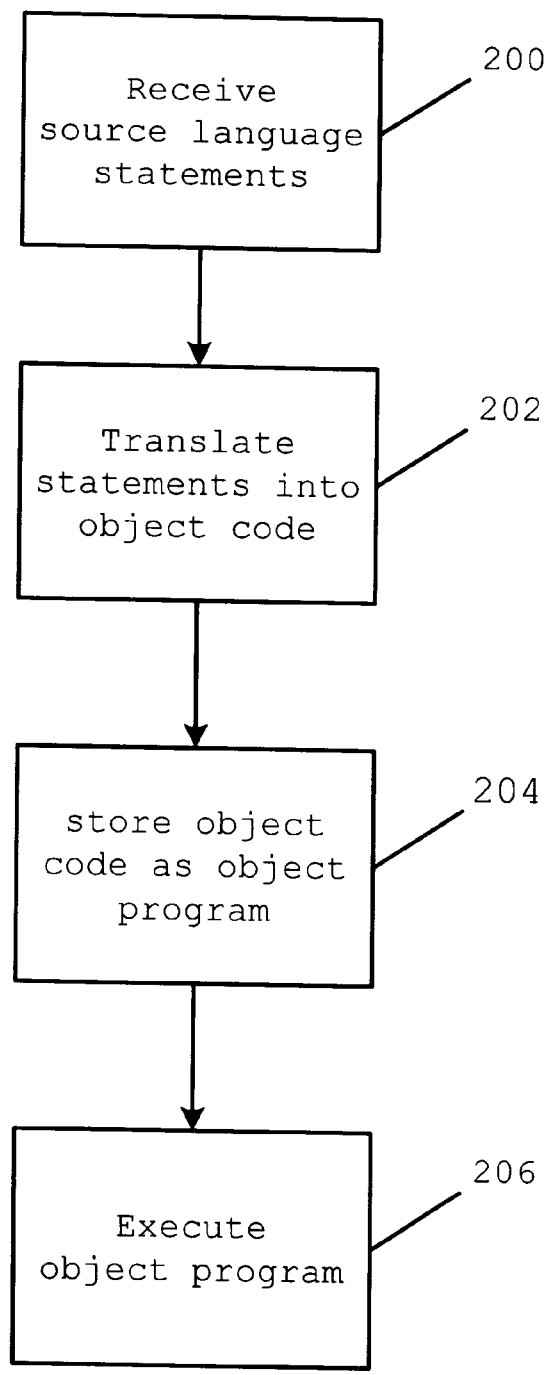
FIG. 2 is a flowchart illustrating the general flow performed for the compilation of the above-identified source language statements and the execution of an object program 120 to accomplish the present invention.

FIG. 2 is a flowchart illustrating the general flow performed for the compilation of the above-identified source language statements in FIGS. 8A–11 which comprise the tracker class source code 114 and source program 116, and the execution of an object program 120 to accomplish the present invention. Block 200 represents the compiler 118 receiving the source language statements into the memory 104 of the computer 100. Block 202 represents the compiler 118 translating the source language statements into executable or object code in the memory 104 of the computer 100, wherein the object code includes instructions for generating data members for the tracker class and for performing the member functions necessary to manipulate those data members according to the present invention. Block 204 represents the compiler 118 storing the executable or object code as an object program 120 in the memory 104 of the computer 100 or on a data storage device 110a–c of the computer. Block 206 represents the computer 100 executing the object program 120 in the memory 104 of the computer 100.

TRACKER OBJECTS LOGIC

Figure 3:
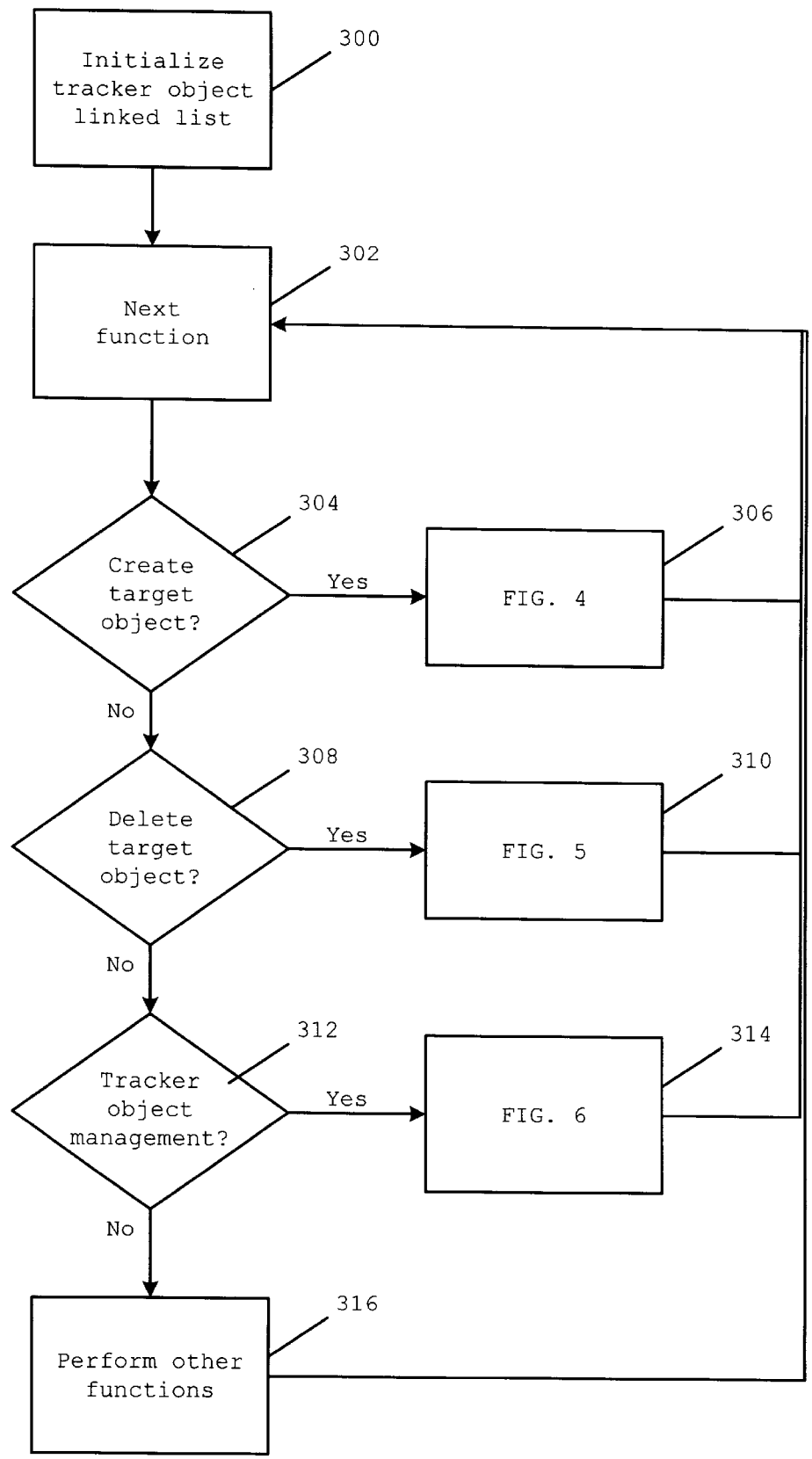
FIG. 3 is a flowchart illustrating the steps performed by the computer to use tracker objects in accordance with the present invention.

FIG. 3 is a flowchart illustrating the steps performed by the computer 100 to use tracker objects in accordance with the present invention. These steps are embodied in instructions in the object program 120 and provide for the tracking of target objects in an object-oriented programming environment.

Block 300 represents the computer 100 initializing, among other things, a tracker object linked list, wherein the linked list is initially empty and comprises only the allocation of a root pointer in the memory 104 of the computer 100.

Block 302 represents the computer 100 determining the next function or instruction to be performed in accordance with the instructions embodied in the object program 120. These functions are identified and performed in following Blocks 304–316. Those skilled in the art will recognize that these are illustrative steps only, and the actual sequence of operations of the computer 100 may comprise state transitions within a message-driven or event-driven environment embodied by the object program 120, or sequential instructions embodied by the object program 120, or any other similar type of operation embodied by the object program 120.

Block 304 is a decision block that represents the computer 100 determining whether the next function to be performed comprises the creation of a target object in the memory 104 of the computer 100. If so, control transfers to Block 306 which represents the steps illustrated in FIG. 4 to perform the function and then back to Block 302; otherwise, control transfers to Block 308.

Block 308 is a decision block that represents the computer 100 determining whether the next function to be performed comprises the destruction of a target object in the memory 104 of the computer 100. If so, control transfers to Block 310 which represents the steps illustrated in FIG. 5 to perform the function and then back to Block 302; otherwise, control transfers to Block 312.

Block 312 is a decision block that represents the computer 100 determining whether the next function to be performed comprises some management function associated with a tracker object in the memory 104 of the computer 100. If so, control transfers to Block 314 which represents the steps illustrated in FIG. 6 to perform the function and then back to Block 302; otherwise, control transfers to Block 316.

Block 316 represents the computer 100 performing all other functions of the object program 120. Thereafter, control transfers back to Block 302.

Figure 4:
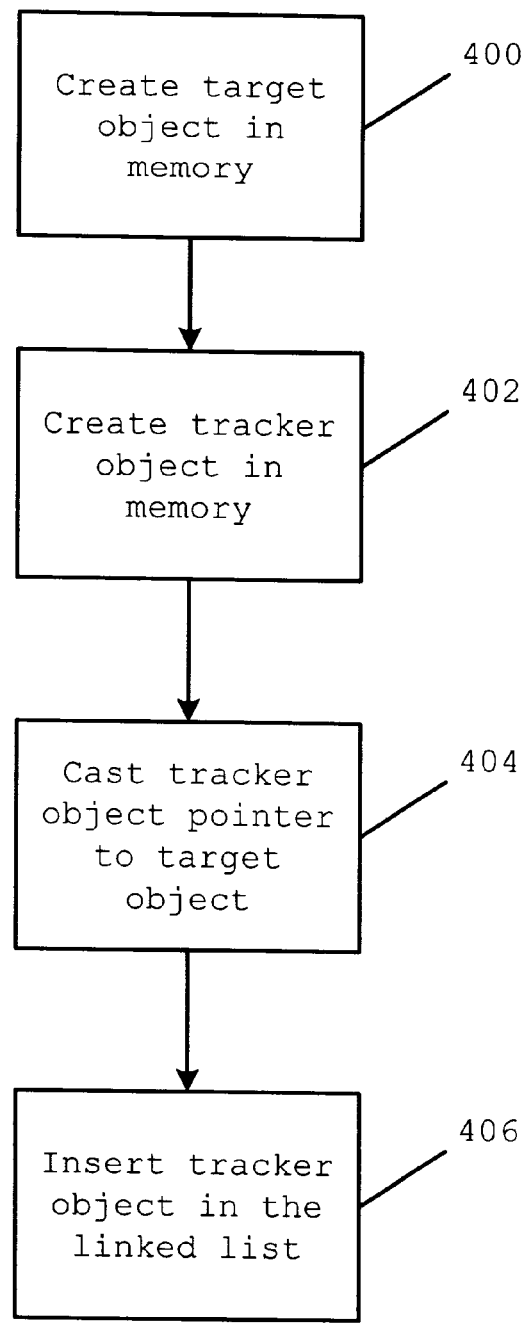
FIG. 4 is a flowchart illustrating the steps performed by the computer in creating a target object in the memory of the computer in accordance with the present invention.

FIG. 4 is a flowchart illustrating the steps performed by the computer 100 in creating a target object in the memory 104 of the computer 100 in accordance with the present invention.

Block 400 represents the computer 100 creating a target object in the memory 104 of the computer 100.

Block 402 represents the computer 100 creating a tracker object in the memory 104 of the computer 100 at the instantiation or creation of the target object. As indicated above, the target class inherits the tracker class and the instantiation of the target object results in the instantiation of the tracker object. Further, due to the use of the template described above, the tracker object is customized for the particular type of target object.

Block 404 represents the computer 100 casting the tracker object pointer to the target object in the memory of the computer 100. The casting step includes the step of inserting a pointer to the target object into the data structure via the constructor function for the tracker class, which, as described above, is invoked by the constructor for the target class. However, the constructor function for the tracker class first "casts" the pointer to adjust the address for the target object based on its type. Further, the constructor function is a copy constructor and thus prevents member-by-member copying of target objects.

Block 406 represents the computer 100 inserting the tracker object into a linked list data structure in the memory 104 of the computer 100, so that the target object may be tracked. In the preferred embodiment, the data structure comprises a linked list, although other data structures such as arrays, etc., could be used as well.

Figure 5:
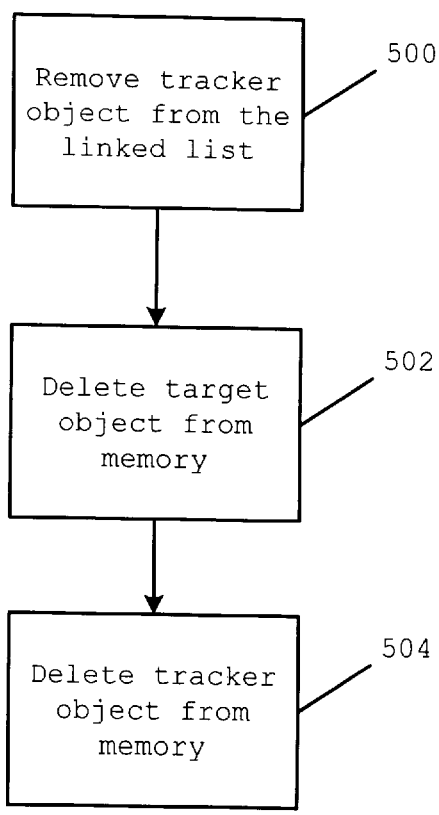
FIG. 5 is a flowchart illustrating the steps performed by the computer in deleting a target object in the memory of the computer in accordance with the present invention.

FIG. 5 is a flowchart illustrating the steps performed by the computer 100 in deleting a target object in the memory 104 of the computer 100 in accordance with the present invention.

Block 500 represents the computer 100 removing an associated tracker object from the linked list data structure in the memory 104 of the computer 100. The removing step is achieved by the computer 100 traversing the linked list looking for a pointer to the target object, removing the associated tracker object from the linked list, and then updating the linked list to reflect the removal of the tracker object.

Block 502 represents the computer 100 deleting a target object in the memory 104 of the computer 100.

Block 504 represents the computer 100 deleting the tracker object from the memory 104 of the computer 100. As indicated above, the target class inherits the tracker class and so the destructor function of the target object results in the invocation of the destructor function of the tracker object.

Figure 6:
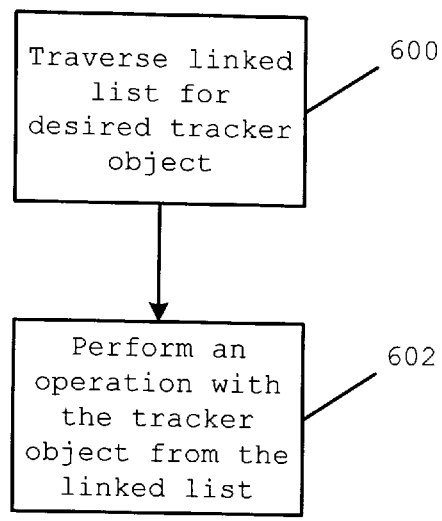
FIG. 6 is a flowchart illustrating the steps performed by the computer in managing tracker objects in the memory of the computer in accordance with the present invention.

FIG. 6 is a flowchart illustrating the steps performed by the computer 100 in managing tracker objects in the memory 104 of the computer 100 in accordance with the present invention.

Block 600 represents the computer 100 traversing the linked list in memory 104 of the computer 100 looking for the desired tracker object, wherein the tracker object is identified by its characteristics or by its pointer to a desired target object contained within the tracker object.

Block 602 represents the computer 100 performing some operation with the tracker object located in the linked list in the memory 104 of the computer 100.

TRACKER OBJECTS LINKED LIST

Figure 7:
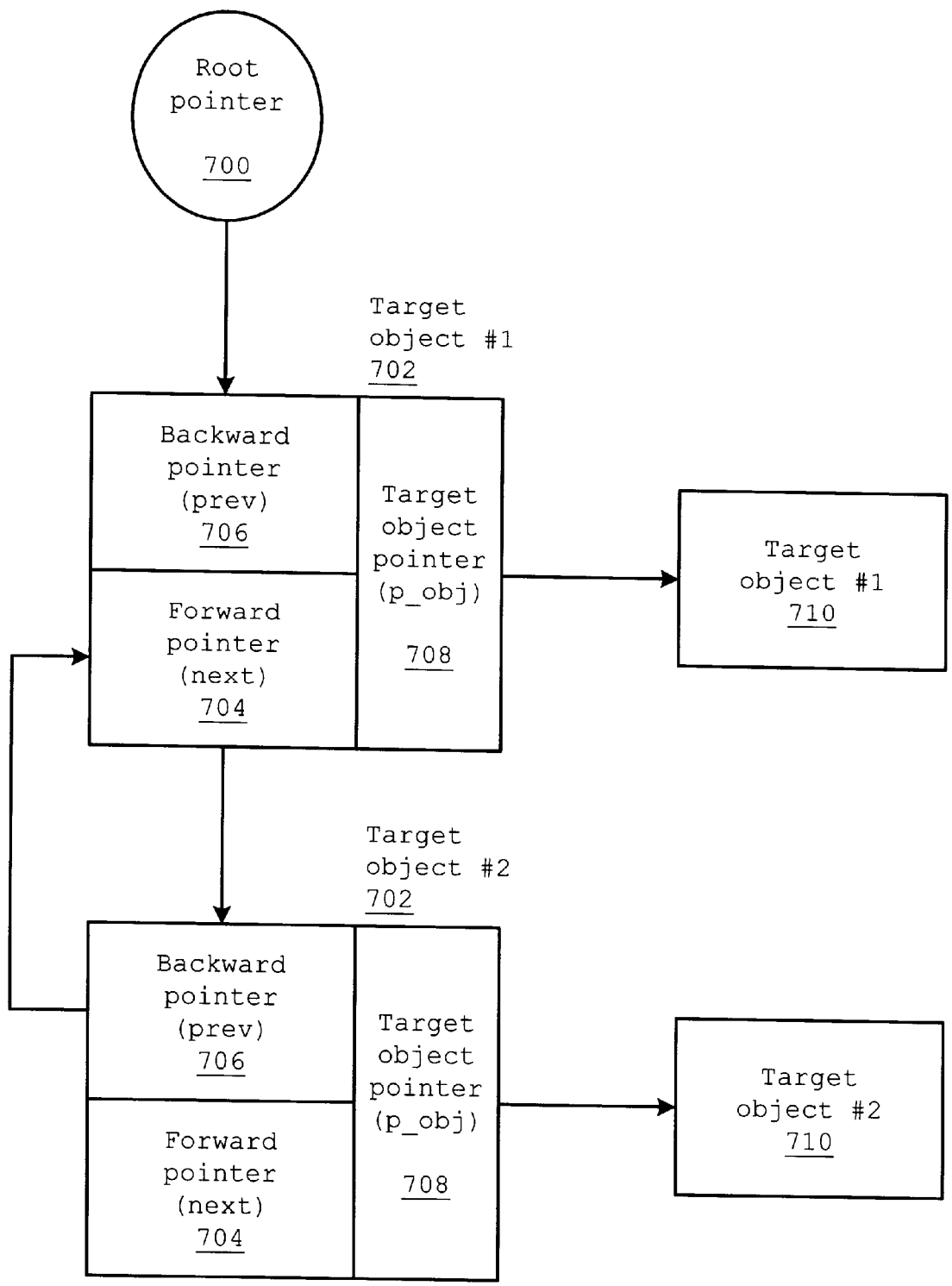
FIG. 7 is a block diagram illustrating the structure and relationship of the target objects and tracker objects stored in the memory of the computer in accordance with the present invention.

FIG. 7 is a block diagram illustrating the structure and relationship of the target objects and tracker objects stored in the memory 104 of the computer 100 in accordance with the present invention. In the preferred embodiment, the tracker objects comprise elements of a doubly linked list, although a singly linked list may also be used. Further, those skilled in the art will recognize that other data structures such as arrays, etc., could be used as well without departing from the scope of the present invention.

A root pointer 700 points to the first tracker object 702 in the linked list. If the linked list is empty, then root pointer 700 contains an address of null (or some other pre-defined value). Each tracker object 702 has a forward pointer 704 containing the address of the next tracker object 702 in the list (or a null value) and a backward pointer 706 containing the address of the previous tracker object 702 in the list (or a null value). The first tracker object 702 in the list has a backward pointer 706 containing a null value (since there are no previous objects) and the last tracker object 702 has a forward pointer 704 containing a null value (since there are no next objects). Each tracker object 702 also has a target object pointer 708 containing the address of its associated target object 710, wherein the target object pointer 708 has been cast, depending on the data type of the target object 710, to obtain the address of the first memory location of the target object 710. Using methods well known in the art, the linked list can be traversed or searched and tracker objects 702 can inserted or removed.

CONCLUSION

This concludes the description of the preferred embodiment of the invention. The following describes some alternative embodiments for accomplishing the present invention. The present invention may be implemented in any type of computer, such as a mainframe, minicomputer, or personal computer. Moreover, the present invention is not limited to the C++ programming language but extends to cover other object oriented languages having similar problems with pointers.

In summary, the present invention discloses a method, apparatus, and article of manufacture for providing object tracking capabilities in object-oriented programming environments using a tracker class and associated functions, and a memory for storing tracker objects. The tracker class, once defined as a base class of any target class that needs the tracking capability, automatically tracks all the objects instantiated from the target class in a linked list. Objects instantiated from classes derived from the tracker class are automatically tracked when the target objects are initialized, be it on a heap or on a stack, because the constructor of the tracker class is invoked by the constructor of the target class. The tracker class is defined as a template, so that it can be applied to any type of target object.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of tracking objects in an object-oriented programming environment executed by a computer, comprising the steps of:
    (a) creating a target object and associated tracker object in a memory of the computer, wherein the tracker object is associated with the target object through inheritance of a tracker class that generates the tracker object by a target class that generates the target object;
    (b) storing a pointer to the target object in the associated tracker object;
    (c) inserting the associated tracker object into a data structure in the memory of the computer, so that the target object can be managed in a well-defined manner; and
    (d) performing a management function on the target object using a member function of the tracker object.

2. The method of claim 1, wherein the creating step comprises the step of performing a constructor function for the target class in the memory of the computer to create the target object, wherein the constructor function for the target class invokes a constructor function for the tracker class that is performed by the computer to create the tracker object.

3. The method of claim 1, wherein the tracker class comprises a template that is customized according to a data type for the target class.

4. The method of claim 1, wherein the storing step further comprises the step of casting the pointer to the target object stored in the associated tracker object to adjust an address for a first memory location of the target object.

5. The method of claim 1, wherein the data structure comprises a linked list.

6. The method of claim 1, further comprising the step of allocating a static root pointer for the data structure in the memory of the computer.

7. The method of claim 1, further comprising the step of preventing member-by-member copying of the target objects when creating the tracker objects.

8. The method of claim 1, further comprising the step of deleting the target object from the memory of the computer.

9. The method of claim 8, wherein the deleting step comprises the step of performing a destructor function for the target class in the memory of the computer to delete the target object, wherein the destructor function for the target class invokes a destructor function for the tracker class that is performed by the computer to delete the tracker object.

10. The method of claim 9, wherein the performing step comprises the steps of removing the associated tracker object from the data structure in the memory of the computer, deleting the target object from the memory of the computer, and deleting the associated tracker object from the memory of the computer.

11. An apparatus for tracking objects in an object-oriented programming environment executed by a computer, comprising:
    (a) a computer having a memory;
    (b) means, performed by the computer, for creating a target object and associated tracker object in a memory of the computer, wherein the tracker object is associated with the target object through inheritance of a tracker class that generates the tracker object by a target class that generates the target object;
    (c) means, performed by the computer, for storing a pointer to the target object in the associated tracker object;
    (d) means, performed by the computer, for inserting the associated tracker object into a data structure in the memory of the computer, so that the target object can be managed in a well-defined manner; and
    (e) means, performed by the computer, for performing a management function on the target object using a member function of the tracker object.

12. A program storage device, readable by a computer having a memory and coupled to a data storage device, tangibly embodying one or more programs of instructions executable by the computer to perform method steps for tracking objects in an object-oriented programming environment executed by the computer, the method comprising the steps of:
    (a) creating a target object and associated tracker object in a memory of the computer, wherein the tracker object is associated with the target object through inheritance of a tracker class that generates the tracker object by a target class that generates the target object;
    (b) storing a pointer to the target object in the associated tracker object;
    (c) inserting the associated tracker object into a data structure in the memory of the computer, so that the target object can be managed in a well-defined manner; and
    (d) performing a management function on the target object using a member function of the tracker object.

13. A memory for storing data for tracking objects in an object-oriented programming environment executed by a computer, comprising:
    a data structure stored in a memory of the computer, the data structure including:
        one or more tracker objects, each associated with a target object residing in the memory of the computer, wherein the tracker object is associated with the target object through inheritance of a tracker class that generates the tracker object by a target class that generates the target object,
        wherein the tracker object stores a pointer to the associated target object, so that the target object can be tracked, so that the target object can be managed in a well-defined manner, and
        wherein the tracker object includes a method function for performing a management function on the target object.

14. The apparatus of claim 11, wherein the means for creating comprises the means for performing a constructor function for the target class in the memory of the computer to create the target object, wherein the constructor function for the target class invokes a constructor function for the tracker class that is performed by the computer to create the tracker object.

15. The apparatus of claim 11, wherein the tracker class comprises a template that is customized according to a data type for the target class.

16. The apparatus of claim 11, wherein the means for storing further comprises the means for casting the pointer to the target object stored in the associated tracker object to adjust an address for a first memory location of the target object.

17. The apparatus of claim 11, wherein the data structure comprises a linked list.

18. The apparatus of claim 11, further comprising the means for allocating a static root pointer for the data structure in the memory of the computer.

19. The apparatus of claim 11, further comprising the means for preventing member-by-member copying of the target objects when creating the tracker objects.

20. The apparatus of claim 11, further comprising the means for deleting the target object from the memory of the computer.

21. The apparatus of claim 20, wherein the means for deleting comprises the means for performing a destructor function for the target class in the memory of the computer to delete the target object, wherein the destructor function for the target class invokes a destructor function for the tracker class that is performed by the computer to delete the tracker object.

22. The apparatus of claim 21, wherein the means for performing comprises:

means for removing the associated tracker object from the data structure in the memory of the computer;

means for deleting the target object from the memory of the computer; and means for deleting the associated tracker object from the memory of the computer.

23. The program storage device of claim 12, wherein the creating step comprises the step of performing a constructor function for the target class in the memory of the computer to create the target object, wherein the constructor function for the target class invokes a constructor function for the tracker class that is performed by the computer to create the tracker object.

24. The program storage device of claim 12, wherein the tracker class comprises a template that is customized according to a data type for the target class.

25. The program storage device of claim 12, wherein the storing step further comprises the step of casting the pointer to the target object stored in the associated tracker object to adjust an address for a first memory location of the target object.

26. The program storage device of claim 12, wherein the data structure comprises a linked list.

27. The program storage device of claim 12, further comprising the step of allocating a static root pointer for the data structure in the memory of the computer.

28. The program storage device of claim 12, further comprising the step of preventing member-by-member copying of the target objects when creating the tracker objects.

29. The program storage device of claim 12, further comprising the step of deleting the target object from the memory of the computer.

30. The program storage device of claim 29, wherein the deleting step comprises the step of performing a destructor function for the target class in the memory of the computer to delete the target object, wherein the destructor function for the target class invokes a destructor function for the tracker class that is performed by the computer to delete the tracker object.

31. The program storage device of claim 30, wherein the performing step comprises the steps of removing the associated tracker object from the data structure in the memory of the computer, deleting the target object from the memory of the computer, and deleting the associated tracker object from the memory of the computer.

* * * * *

UNITED STATES PATENT AND TRADEMARK OFFICE
CERTIFICATE OF CORRECTION

PATENT NO.    : 5,940,616
DATED         : August 17, 1999
INVENTOR(S)   : I-Shin Andy Wang It is certified that error appears in the above-identified patent and that said Letters Patent is hereby corrected as shown below:

Title page, item [56]

Page 1, Column 2, Other Publications, please add the following cited reference:
Hlava, A., "Ensuring Internal Consistency in a Set of Interconnected Classes," <u>IBM Technical Disclosure Bulletin</u>, Vol. 37, No. 2B, pp. 697-698, February 1994

Signed and Sealed this

Fourth Day of July, 2000

Attest:

Q. TODD DICKINSON

*Attesting Officer*　　　　　*Director of Patents and Trademarks*